Dec. 24, 1935.    D. D. GOLDBERG    2,025,411
VALVE CONTROL MECHANISM
Filed March 9, 1935    2 Sheets-Sheet 1
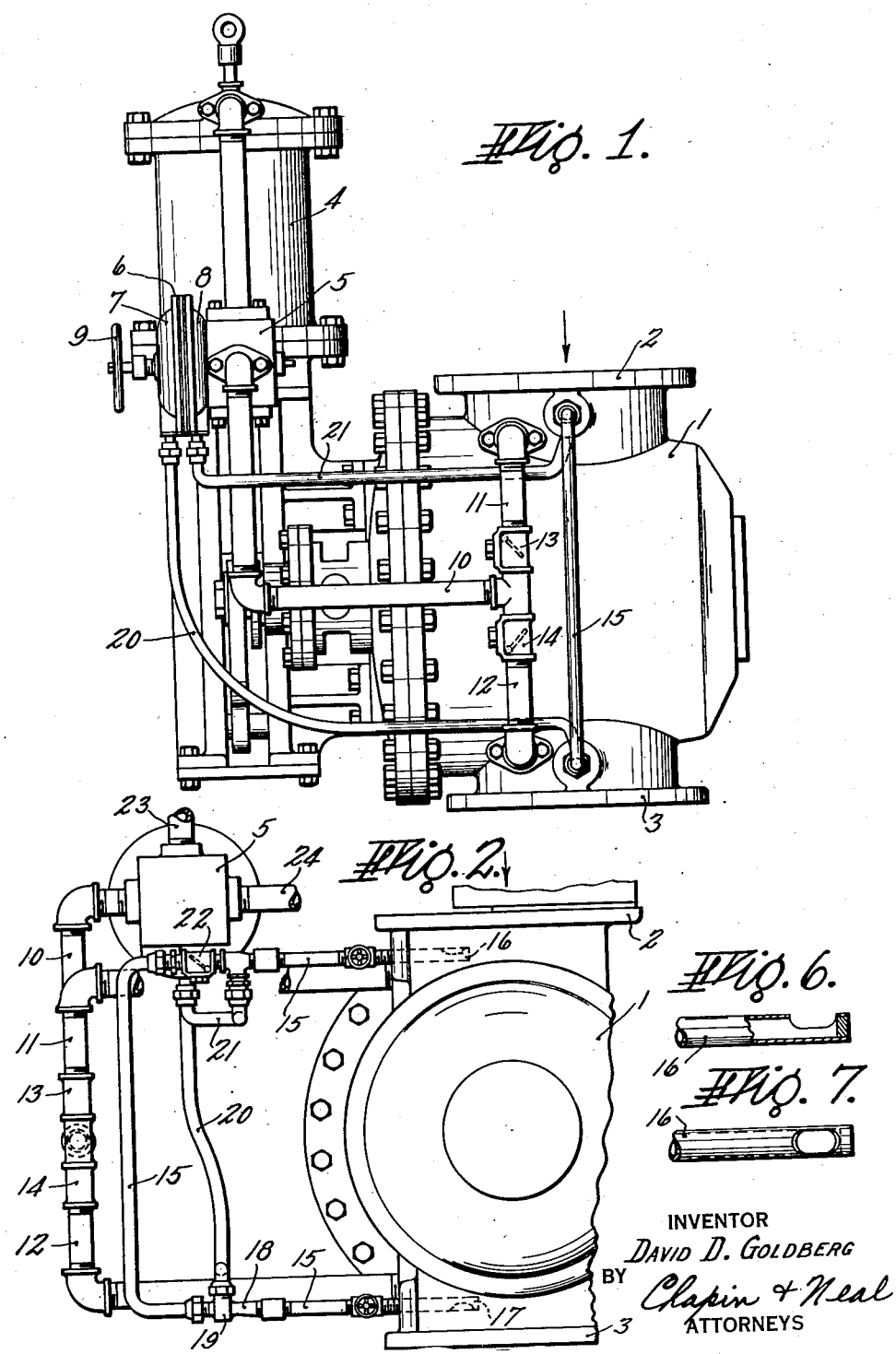
INVENTOR
DAVID D. GOLDBERG
BY Chapin & Neal
ATTORNEYS Dec. 24, 1935.  D. D. GOLDBERG  2,025,411
VALVE CONTROL MECHANISM
Filed March 9, 1935  2 Sheets-Sheet 2
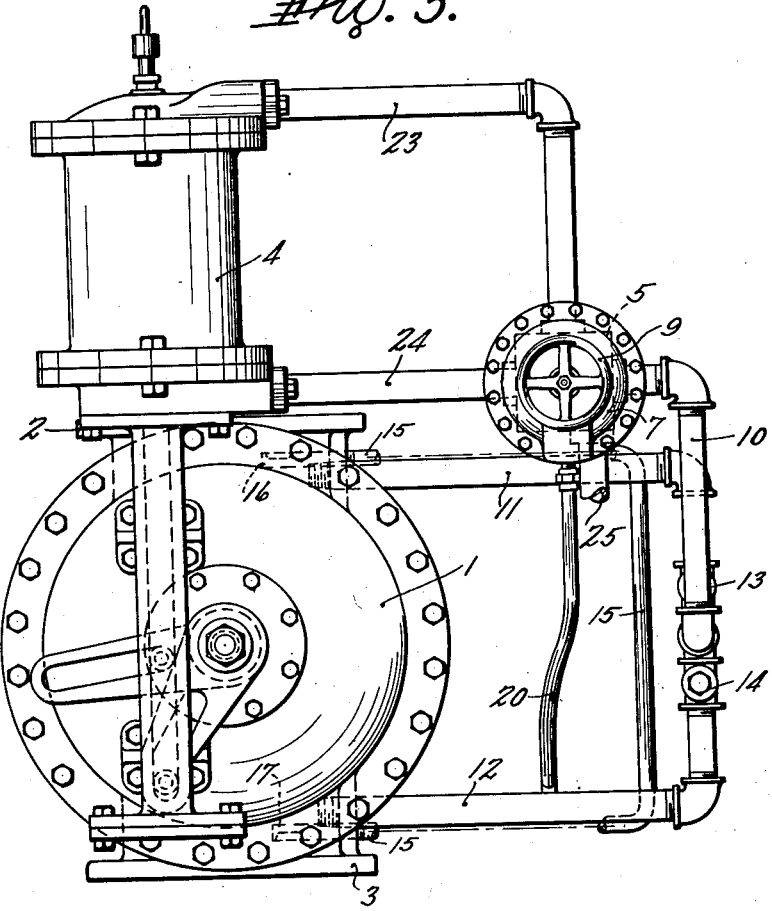
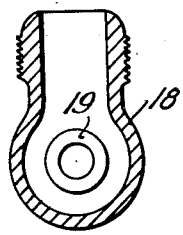
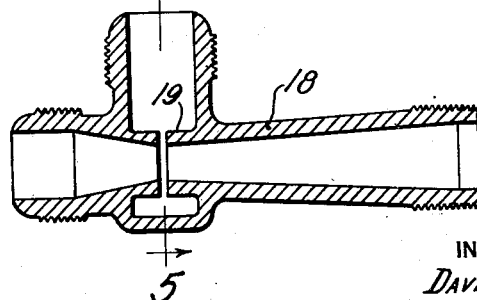
INVENTOR
DAVID D. GOLDBERG
BY Chapin & Neal
ATTORNEYS Patented Dec. 24, 1935

2,025,411

UNITED STATES PATENT OFFICE 2,025,411

VALVE CONTROL MECHANISM

David D. Goldberg, Springfield, Mass., assignor to Automatic Cone Valve Company, Indian Orchard, Mass., a corporation of Illinois Application March 9, 1935, Serial No. 10,226

5 Claims. (Cl. 137—153)

This invention relates to automatic control mechanism for power operated valves in fluid conduits, pipe lines and the like, wherein the opening or closing of the valve is determined by the pressure and fluid flow conditions in said conduit or pipe line.

A suitable application of the invention would be in the control of a power operated check valve in a pipe line supplied from a centrifugal pump. In such an installation it is desirable to have the valve open when the pressure head produced by the pump has reached a certain value and to remain open during the normal operation of the pump but to close if for any reason the pump stops or loses its efficiency and thus prevent any back flow through the pump which in most cases would be highly objectionable. Furthermore it is important in avoiding water hammer and surges in the use of such check valves, that the control mechanism should operate to close the valve before any objectionable back flow occurs, in other words, the closing movement of the valve should be inaugurated as soon as the velocity flow through the valve drops below normal and completed before any objectionable back flow can take place.

The present invention has for its object the accomplishment of the aforesaid purposes in automatic control mechanism and resides in the combination and arrangement of parts as hereinafter described and claimed.

Referring to the drawings which illustrate the preferred embodiment of the invention, Fig. 1 is a top plan view of a valve casing, power means for operating the valve therein and of the automatic control mechanism therefor;

Fig. 2 is an end view of said structure partly cut away looking from the right end of Fig. 1;

Fig. 3 is an end view of said structure looking from the left end of Fig. 1;

Fig. 4 is a detached view somewhat enlarged and in longitudinal section of the Venturi passage;

Fig. 5 is a cross section of said Venturi passage along line 5—5 of Fig. 4; and

Figs. 6 and 7 are detail views of the Pitot tube used in the connections as will be described.

The details of construction of the main valve in the conduit, the hydraulic power means for operating said valve, the four-way control valve for said hydraulic power means and the pressure actuated diaphragm for operating said four-way valve are all as illustrated and described in my Patent No. 1,890,678 dated December 13, 1932 and therefore need not be particularly described herein.

The main valve casing is indicated at 1, and it will be understood that its respective flanged ends 2 and 3 will be connected in the usual way in a pipe line or conduit. The normal flow of fluid through the conduit and valve is indicated by the arrow in Fig. 1 and it will be on this side of the valve that the main source of supply or centrifugal pump will be located. For convenience this side of the valve will be termed the upstream side and the other side of the valve at the end 3 of the casing will be termed the downstream side. The main valve within the casing 1 is of a rotating plug type and the operating connections between the stem of said plug and the piston of the hydraulic power cylinder 4 are as described in my patent referred to.

Within the casing 5 is mounted the four-way control valve for the hydraulic cylinder 4 and the casing for the pressure actuated diaphragm control adjacent thereto, is indicated at 6. It will be understood that within said casing 6 there is mounted a movable diaphragm connected to the piston of a four-way valve in casing 5 for operating said valve and that within said casing 6 at the left of said diaphragm is a pressure chamber 7 and on the right of said diaphragm is a pressure chamber 8 under the influence of which said diaphragm is moved and positioned. For convenience in reference the pressure chamber 7 at the left side of said diaphragm in casing 6 will be termed the valve closing pressure chamber and the pressure chamber 8 at the right of said diaphragm will be termed the valve opening pressure chamber. It should be understood that when the pressure in chamber 7 is such that the diaphragm is moved to the right, the four-way valve in casing 5 will be positioned to open the proper ports for causing the piston in power cylinder 4 to move down and close the main valve in casing 1 and that when the pressure in chamber 8 is such as to move the diaphragm in said casing 6 to the left, the four-way valve in casing 5 will be positioned to open the proper ports for moving the piston in power cylinder 4 upwardly to open the main valve in casing 1. It should also be understood that the diaphragm within casing 6 when under equal pressures in chambers 7 and 8, is biased with the tendency of moving toward the right into its valve closing position. This biasing is accomplished preferably by a spring within said casing 6 pressing constantly toward the right against the diaphragm therein and there is a suitable adjustment for the tension of said spring. The hand wheel 9 and its stem are for the purpose of effecting a hand operation of the diaphragm from left to right, in other words, from valve opening position to valve closing position only. The stem of the hand wheel 9 merely abuts the diaphragm and cannot pull it positively from right to left. As before stated, the full details of the above construction and operation of the diaphragm are given in my patent referred to.

Pipe 10 is a power line for conveying fluid power to the four-way valve casing 5 for distribution therein to the proper port in the cylinder 4. Power line 10 may receive its fluid power from any convenient source but in the present embodiment is connected to the main conduit at both sides of the valve by branches 11 and 12 as shown, check valves 13 and 14 being provided in said branch lines to prevent by-passing of fluid around the main valve and permitting the power line 10 to receive fluid from whichever side of the valve is under fluid pressure. 23 and 24 are the fluid distributing pipes from the casing 5 to the upper and lower ends of cylinder 4 respectively and pipe 25 is the drain pipe from casing 5 (see Fig. 3).

The particular means for making the valve control mechanism responsive to pressure and fluid flow conditions in the main conduit and whereby the main valve in the casing 1 will be operated in the manner previously indicated will now be described. A pipe line 15 is arranged as a by-pass for the main conduit preferably but not necessarily around the main valve in casing 1 and one end of said pipe line 15 is connected in the upstream side of said conduit by an upstream facing Pitot tube 16. The other end of said by-pass pipe line 15 is connected to the downstream side of said conduit by a downstream facing Pitot tube 17. Therefore upon the occurrence of fluid flow in said conduit, some of the fluid therein will flow through the by-pass pipe 15, the velocity of flow in said pipe 15 of course being determined by that in the main conduit.

Located at any convenient portion of said by-pass pipe line 15 between its ends is a section providing a Venturi-like passage 18 with a constricted throat portion 19. The function of this Venturi passage as is well known, will be to increase the flow velocity at the constricted throat portion thereof and to diminish the effective static pressure head of the fluid at that point, said effective pressure being diminished in accordance with the velocity of flow through the pipe line 15 and the Venturi passage 18. A pipe 20 connects the throat portion 19 of said Venturi passage to the left hand or valve closing pressure chamber within the diaphragm casing 6 so as to communicate to said pressure chamber the reduced effective static pressure which occurs at said Venturi throat 19 due to any velocity flow through the pipe 15. A pipe 21 leading from the upper branch of pipe 15, see Fig. 2, connects the upstream side of the conduit with the right hand or valve opening pressure chamber 8 of said diaphragm casing 6, thereby communicating at all times the full static pressure head of the conduit at the upstream side of said valve to said valve opening pressure chamber in the diaphragm casing 6. In order to check a reverse flow of fluid through the Venturi passage 18 of the by-pass pipe 15 from the downstream side of the main valve to the upstream side of the valve, a check valve 22 is provided in the pipe line 15 as shown.

By this arrangement any reverse flow through the main valve will deliver by means of the Pitot tube 17, pipe 15 and pipe 20, substantially the full pressure of the reverse flow to the valve closing pressure chamber 7 of the diaphragm casing 6 which action will insure closing of the main valve if not already closed.

The operation of the control mechanism is as follows: Assume the main valve in the casing 1 is closed and fluid is being delivered to the upstream side of the valve from a centrifugal pump or other source. The pressure head in the upstream side of the valve will gradually build up until sufficient pressure is delivered to the valve opening pressure chamber 8 to move the diaphragm in casing 6 to the left and thus open the main conduit valve as previously described. So long as the pressure head at the upstream side of the valve is sufficient to keep the fluid flowing through the valve, there will be a flow of fluid around the by-pass pipe 15 and through the Venturi passage 18 and a diminished static pressure head will be communicated to the valve closing pressure chamber 7. The full pressure head being in the right hand chamber 8 and a diminished pressure head in the left hand chamber 7 the diaphragm will be held to the left or valve opening position, thus keeping the main valve open. The degree of excess pressure in the chamber 8 over that in chamber 7 for keeping the main valve open is determined by the adjustment of the biasing spring, which as before stated augments the pressure at the left hand side of the diaphragm in casing 6. If for any reason such as pump failure, the velocity of flow through the main valve decreases, the pressures on the opposite sides of the diaphragm in casing 6, immediately approach an equilibrium since the slower velocity of flow through the Venturi passage 18 causes a less diminished static pressure head in chamber 7 than previously existed. As soon as the increasing pressure in chamber 7, augmented by the spring in said casing 6, is sufficient, the diaphragm will move toward the right to its valve closing position and thus close the main valve. It will be understood that in operation the parts are so adjusted and the biasing spring within the diaphragm casing 6 so tensioned that the main valve will begin to close as soon as any appreciable slowing down of velocity flow occurs through the main valve and that the main valve will be completely closed prior to the occurrence of any objectionable back flow through the main conduit.

I claim:

1. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a pipe leading out from and back into said conduit as a by-pass and having intermediate its ends a Venturi passage through which fluid flowing in said conduit is adapted to pass, said by-pass pipe having at least one of its ends which open into said conduit provided with means for inducing a flow through said by-pass pipe from the flow through said conduit, a second pipe having connections for communicating the pressure in said conduit at the upstream side of said main valve to the valve opening pressure chamber, and a third pipe having connections for communicating the pressure at the throat of said Venturi passage in said by-pass pipe to said valve closing pressure chamber.

2. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a pipe leading out from and back into said conduit as a by-pass and having intermediate its ends a Venturi passage through which fluid flowing in said conduit is adapted to pass, said by-pass pipe having one end connected with said conduit by an upstream facing Pitot tube and the other end connected with said conduit by a downstream facing Pitot tube, a second pipe having connections for communicating the pressure in said conduit at the upstream side of said main valve to the valve opening pressure chamber, and a third pipe having connections for communicating the pressure at the throat of said Venturi passage in said by-pass pipe to said valve closing pressure chamber.

3. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a pipe leading out from and back into said conduit as a by-pass and having intermediate its ends a Venturi passage through which fluid flowing in said conduit is adapted to pass, said by-pass pipe having one end connected to said conduit by an upstream facing Pitot tube and the other end connected to said conduit by a downstream facing Pitot tube, means restricting a flow through said Venturi passage from the downstream facing Pitot tube to the upstream facing Pitot tube, a second pipe having connections for communicating the pressure in said conduit at the upstream side of said main valve to the valve opening pressure chamber, and a third pipe having connections for communicating the pressure at the throat of said Venturi passage in said by-pass pipe to said valve closing pressure chamber.

4. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, a pipe serving as a by-pass around said valve and having one end connected to said conduit by an upstream facing Pitot tube at the upstream side of said valve and its other end connected to said conduit by a downstream facing Pitot tube at the downstream side of said valve, a Venturi passage in said by-pass pipe, a check valve in said by-pass pipe to permit flow through said Venturi passage only in the downstream direction, a second pipe having connections for communicating the pressure in said conduit at the upstream side of said main valve to the valve opening pressure chamber, and a third pipe having connections for communicating the pressure at the throat of said Venturi passage in said by-pass pipe to said valve closing pressure chamber.

5. The combination with a fluid conduit having a main valve therein for opening and closing said conduit and power operated means for operating said valve, of automatic control mechanism for said power means responsive to fluid flow conditions in said conduit, comprising a fluid pressure actuated member having a valve opening pressure chamber at one side thereof and a valve closing pressure chamber at the other side thereof, whereby the pressure conditions in said opposed chambers control the movement of said member from a valve opening position to a valve closing position and vice versa, means whereby with equal pressures in said opposed chambers said member tends to move to valve closing position, a pipe serving as a by-pass around said valve and having one end connected to said conduit by an upstream facing Pitot tube at the upstream side of said valve and its other end connected to said conduit by a downstream facing Pitot tube at the downstream side of said valve, a Venturi passage in said by-pass pipe, a check valve in said by-pass pipe to permit flow through said Venturi passage only in the downstream direction, a second pipe having connections for communicating the pressure in said conduit at the upstream side of said main valve to the valve opening pressure chamber, and a third pipe having connections for communicating the pressure at the throat of said Venturi passage in said by-pass pipe to said valve closing pressure chamber.

DAVID D. GOLDBERG.